(12) United States Patent
Tsurumi

(10) Patent No.: US 7,566,077 B2
(45) Date of Patent: Jul. 28, 2009

(54) QUICK-CONNECT COUPLING

(75) Inventor: Kazuyuki Tsurumi, Koga (JP)

(73) Assignee: Sanoh Kogyo Kabushiki Kaisha, Ibaraki-Ken (JP)

(*) Notice: Subject to any disclaimer, the term of this patent is extended or adjusted under 35 U.S.C. 154(b) by 0 days.

(21) Appl. No.: 10/582,554

(22) PCT Filed: Nov. 9, 2004

(86) PCT No.: PCT/JP2004/016595

§ 371 (c)(1),
(2), (4) Date: Apr. 19, 2007

(87) PCT Pub. No.: WO2005/057073

PCT Pub. Date: Jun. 23, 2005

(65) Prior Publication Data

US 2007/0273150 A1   Nov. 29, 2007

(30) Foreign Application Priority Data

Dec. 12, 2003   (JP) .................... 2003-414947

(51) Int. Cl.
*F16L 37/00* (2006.01)
(52) U.S. Cl. .................... 285/93; 285/305
(58) Field of Classification Search ............ 285/93, 285/305

See application file for complete search history.

(56) References Cited

U.S. PATENT DOCUMENTS

| | | | | |
|---|---|---|---|---|
| 5,863,077 A * | 1/1999 | Szabo et al. | .................... | 285/3 |
| 6,145,886 A * | 11/2000 | Ohta et al. | .................... | 285/4 |
| 6,846,021 B2 * | 1/2005 | Rohde et al. | .................... | 285/81 |
| 6,869,110 B2 * | 3/2005 | Okada et al. | .................... | 285/319 |
| 7,014,220 B2 * | 3/2006 | Szabo et al. | .................... | 285/305 |
| 7,390,029 B2 * | 6/2008 | Matsubara | .................... | 285/321 |
| 2003/0197373 A1 | 10/2003 | Stieler | | |

FOREIGN PATENT DOCUMENTS

| | | |
|---|---|---|
| EP | 1 369 634 | 12/2003 |
| FR | 2 827 364 | 1/2003 |
| JP | 2001-507109 | 5/2001 |

(Continued)

OTHER PUBLICATIONS

Patent Abstract of 2004-125130 A Published Apr. 22, 2004.

(Continued)

*Primary Examiner*—David E Bochna
(74) *Attorney, Agent, or Firm*—Ladas and Parry LLP

(57) ABSTRACT

A quick-connect coupling has a retainer for retaining a tube in a coupling body. The retainer is pressed in the coupling body so as to lock the tube in place in the coupling body. The retainer cannot be fully pressed in the coupling body and projects from the coupling body to indicate that the tube is not properly connected to the coupling body unless the tube is inserted completely in the coupling body. The retainer is combined with complete connection verifying legs that enables the retainer to be able to be pressed in the coupling body when an annular ridge formed in an end part of a tube inserted in the coupling body is advanced beyond a position where the retainer is able to engage with the annular ridge.

11 Claims, 8 Drawing Sheets

FOREIGN PATENT DOCUMENTS

| | | |
|---|---|---|
| JP | 2001-182881 | 7/2001 |
| JP | 2003-004188 | 1/2003 |
| JP | 2004-125130 A | 4/2004 |
| JP | 2004-251319 | 9/2004 |

OTHER PUBLICATIONS

Patent Abstract of 2001-182881 A Published Jul. 6, 2001.
Patent Abstracts of Japan of JP 2004-251319 dated Sep. 9, 2004.
Patent Abstracts of Japan of JP 2003-004188 dated Jan. 8, 2003.

* cited by examiner

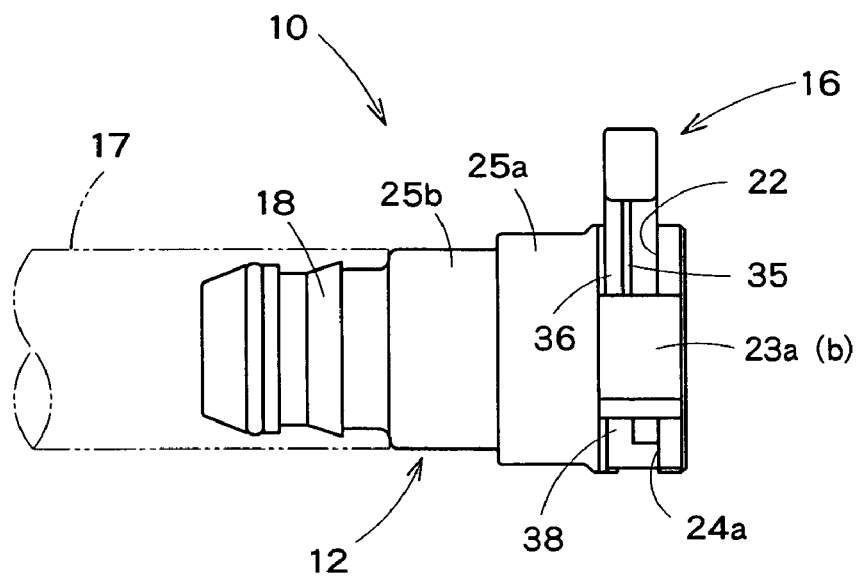
F I G. 2
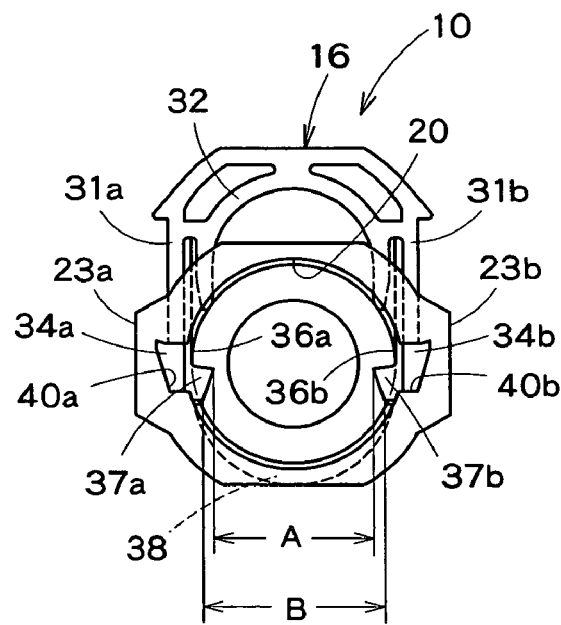
F I G. 3

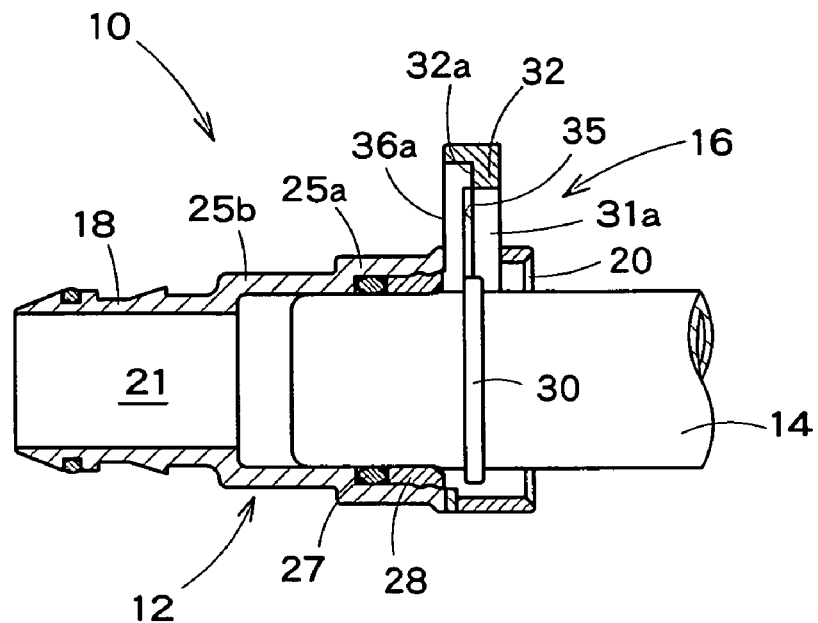
F I G. 4(a)
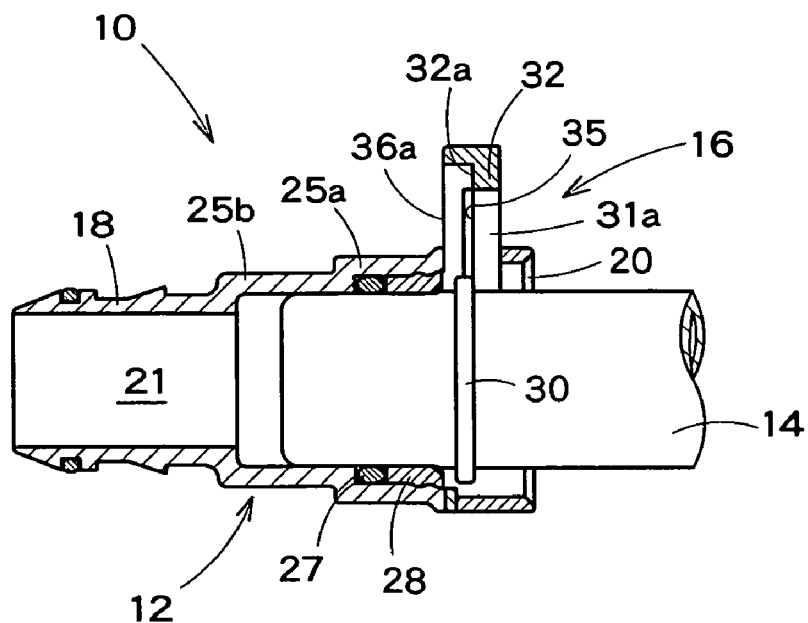
F I G. 4(b)

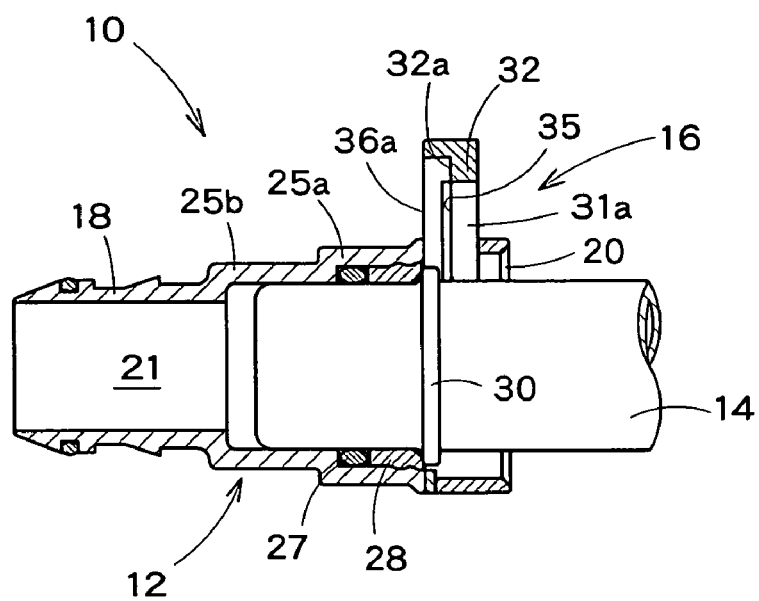
F I G. 5
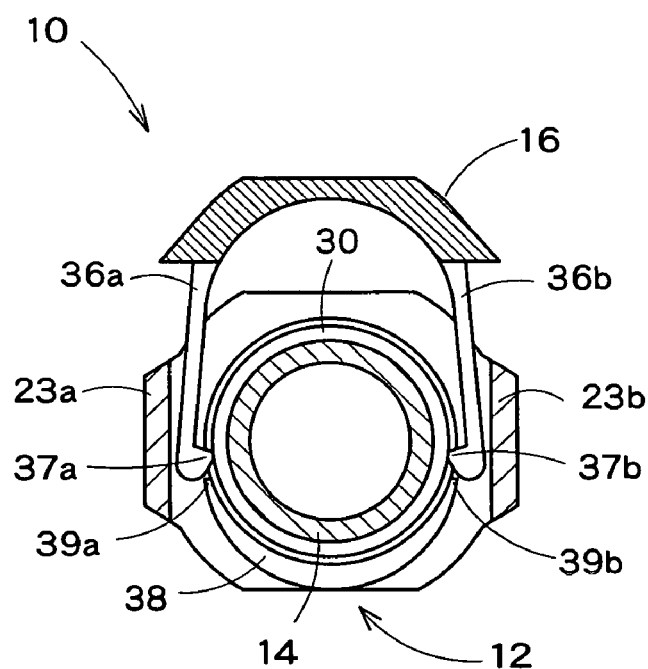
F I G. 6

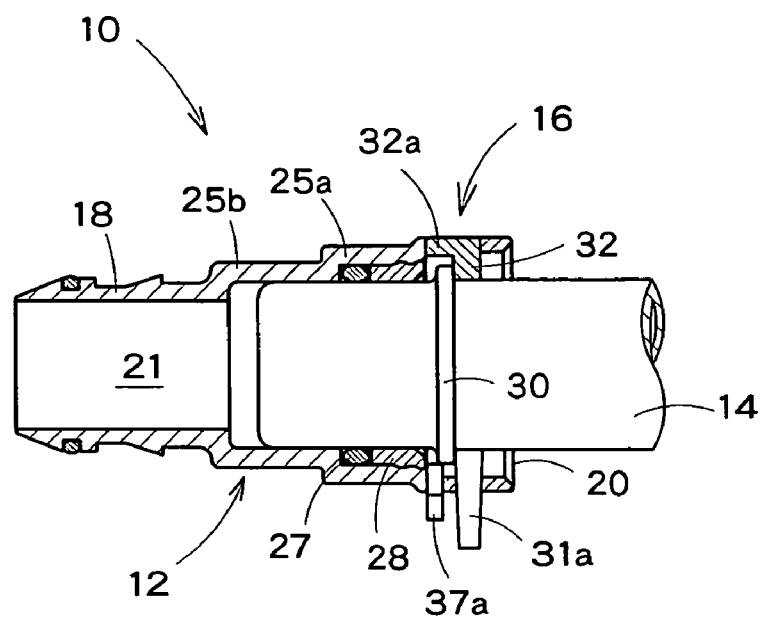
F I G. 7
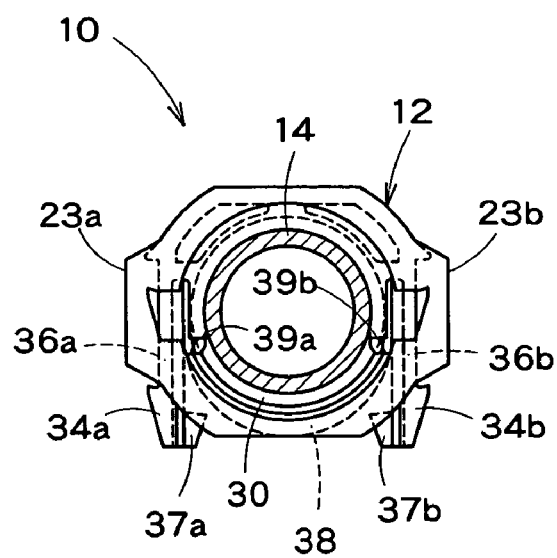
F I G. 8

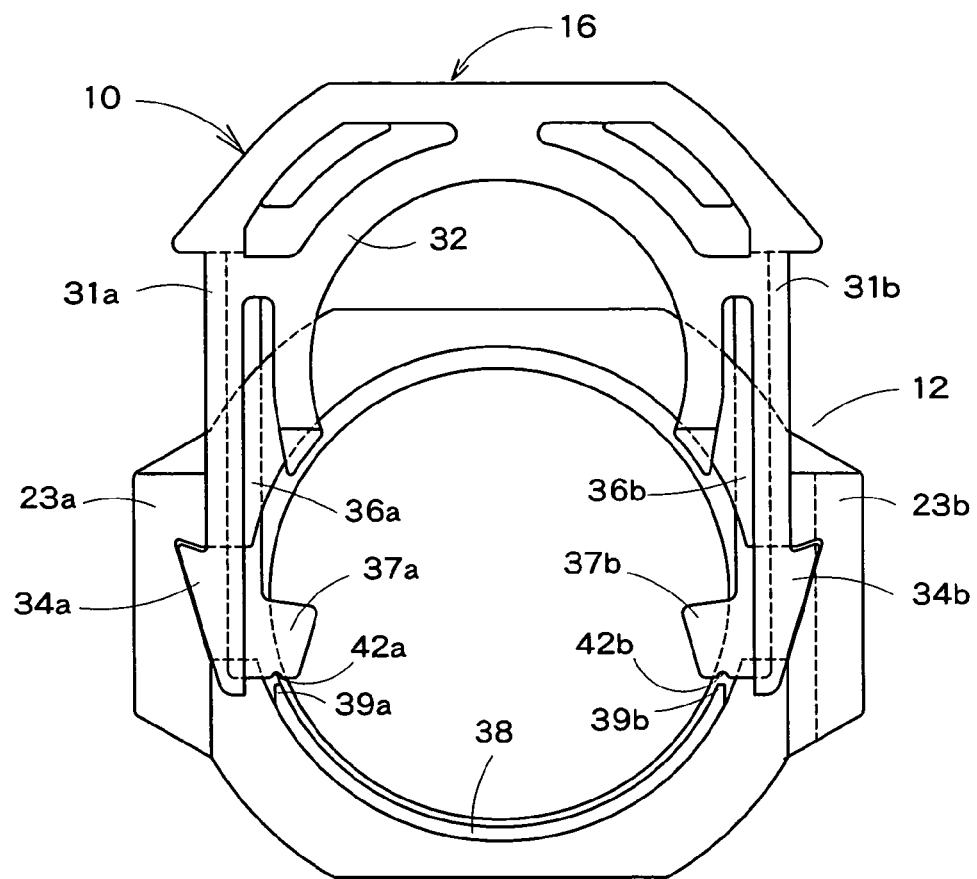
F I G. 9
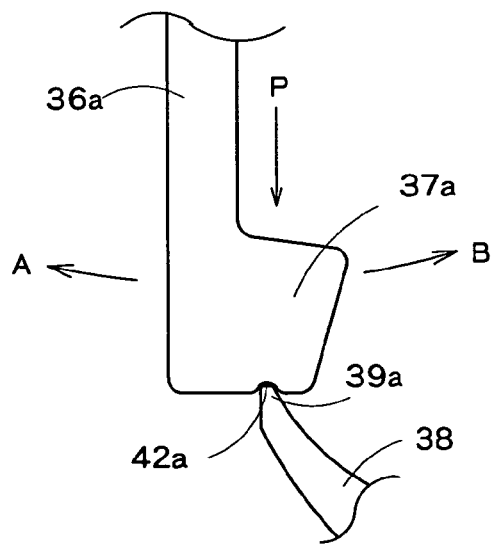
F I G. 10

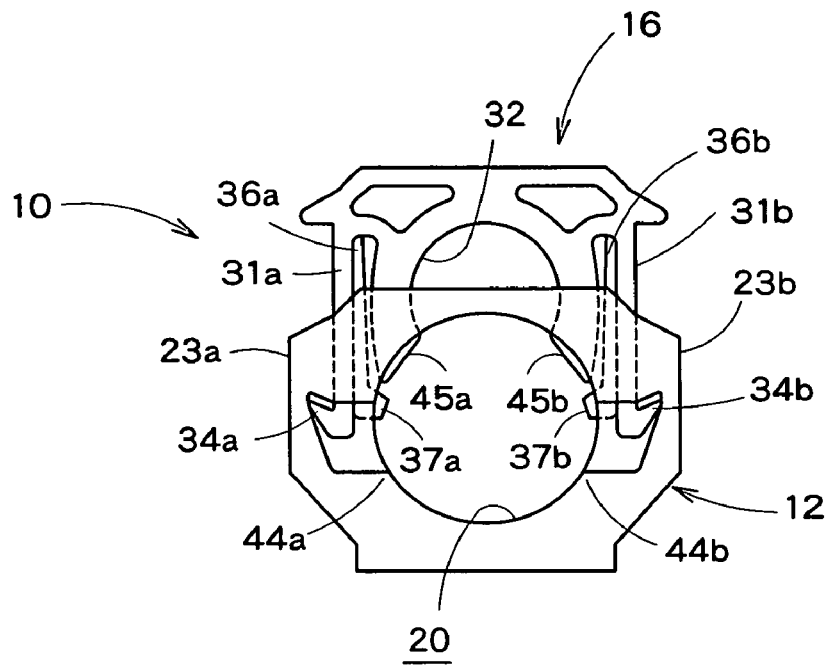
F I G. 11(a)
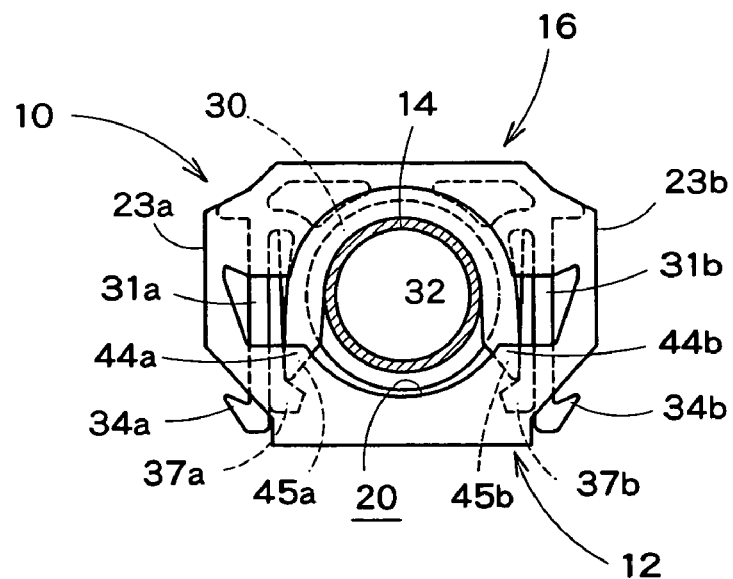
F I G. 11(b)

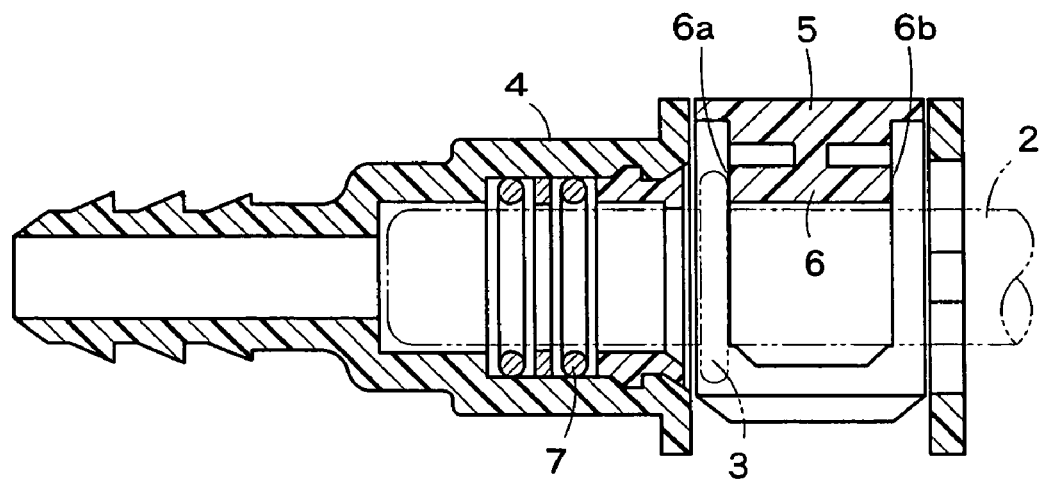
F I G. 12
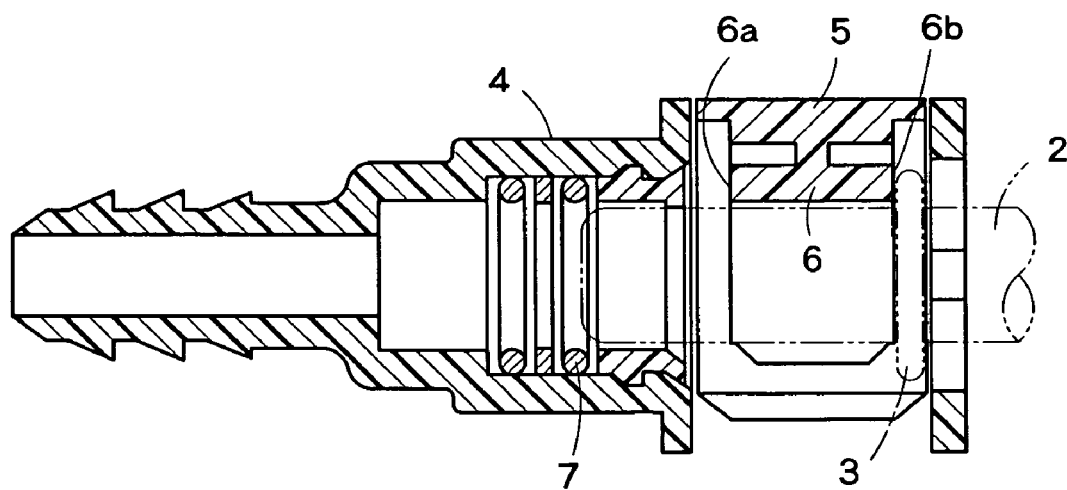
F I G. 13

QUICK-CONNECT COUPLING

TECHNICAL FIELD

The present invention relates to a quick-connect coupling for coupling tubes of an automotive fuel system.

BACKGROUND ART

Quick-connect couplings are used prevalently for connecting fuel tubes of automotive fuel systems. The quick-connect coupling is capable of simply and quickly connecting tubes without using any fastening means, such as bolts. The quick-connect coupling has a coupling body and a retainer. An end part of a tube is inserted in the coupling body, and the retainer is pressed in the coupling body to retain the tube in the coupling body. Representative techniques related with quick-connect couplings are disclosed in U.S. Pat. No. 5,542,716 and JP 2002-206683 A.

Referring to FIG. 12, an annular ridge 3 is formed on the outer circumference of an end part of a tube 2 fitted in a coupling body 4. A slide retainer 5 is pressed radially in a window formed in the coupling body 4. An end edge 6a of a rib 6 formed in the retainer engages with the annular ridge 3 to retain the end part of the tube 2 in the coupling body 4. A correct method of connecting the tube 2 and the quick-connect coupling fits the end part of the tube in the coupling body 4 first, and then the retainer 5 is pushed in the window of the coupling body 4.

However, it often occurs that the retainer 5 is pressed in the window of the coupling body 4 as shown in FIG. 13 before fitting the end part of the tube 2 in the coupling body 4. If the tube 2 is applied to the coupling body 4 in an effort to fit the end part of the tube 2 into the coupling body 4 after pressing the retainer 5 in the window of the coupling body 4, the other end edge 6b of the rib 6 stops the annular ridge 3 and obstructs the further insertion of the tube 2 in the coupling body 4.

Consequently, the quick-connect coupling and the tube 2 are connected incompletely. The appearance of the incomplete connection of the quick-connect coupling and the tube 2 cannot be discriminated from that of the complete connection of the quick-connect coupling and the tube 2. Therefore, the known quick-connect coupling is designed such that the end part of the tube 2 is unable to engage with O rings when the quick-connect coupling and the tube 2 are connected incompletely, and the incomplete connection can be found by the detection of the leakage of a fluid in a leakage test.

A quick-connect coupling disclosed in JP 11-230456 A is designed so that the incomplete connection of the quick-connect coupling and a tube can be noticed at a glance. The quick-connect coupling has, in addition to a coupling body and a retainer, complete connection verifying legs. The complete connection verifying legs cannot be easily separated from the coupling body unless the tube is inserted in the coupling body to a coupling position and the retainer is engaged normally with the tube.

Although this quick-connect coupling is capable of indicating incomplete connection, the quick-connect coupling is unable to prevent incomplete connection.

DISCLOSURE OF THE INVENTION

Accordingly, it is an object of the present invention to solve the foregoing problems and to provide a quick-connect coupling capable of preventing the incomplete connection of the quick-connect coupling and a pipe by making a retainer unable to lock a pipe unless the pipe is inserted fully in the quick-connect coupling to a complete connection position.

A quick-connect coupling according to the present invention includes: a coupling body in which an end part, provided with an annular ridge, of a tube is inserted; and a retainer to be inserted through a window into the coupling body in a direction perpendicular to the axis of the coupling body so as to engage with the annular ridge to retain the end part of the tube in the coupling body; wherein the retainer engages with the annular ridge to connect the tube and the coupling body, and complete connection verifying legs are formed in combination with the retainer to enable the retainer to be pressed through the window into the coupling body only after the annular ridge of the end part of the tube inserted in the coupling body has advanced beyond a position where the retainer is able to engage with the annular ridge.

According to the present invention, the insertion of the complete connection verifying legs in the coupling body is obstructed by blocking parts and the retainer cannot be pressed in the coupling body unless the tube is inserted in the coupling body beyond the position where the retainer is able to engage with the annular ridge. Thus the incomplete engagement of the retainer and the tube can be surely prevented.

BRIEF DESCRIPTION OF THE DRAWINGS

FIG. 2 is a side elevation of the quick-connect coupling shown in FIG. 1;

FIG. 3 is a front view of the quick-connect coupling shown in FIG. 1;

FIGS. 4(a) and 4(b) are longitudinal sectional views of the quick-connect coupling shown in FIG. 1 in a state where an annular ridge formed on a tube is in contact with complete connection verifying legs and a state where the annular ridge of the tube has not yet passed a locking point where a retainer engages with the annular ridge, respectively;

FIG. 5 is a longitudinal sectional view of the quick-connect coupling shown in FIG. 1 in a state where a tube is inserted in the quick-connect coupling to a position where the retainer is able to exercise its function;

FIG. 6 is a cross-sectional view of the quick-connect coupling shown in FIG. 1 in a state where the annular ridge is at a position shown in FIG. 5 and the complete connection verifying legs is expanded;

FIG. 7 is a longitudinal sectional view of the quick-connect coupling shown in FIG. 1 in a state where the annular ridge of the tube is securely retained by the retainer;

FIG. 8 is an end view of the quick-connect coupling in a state shown in FIG. 7;

FIG. 9 is a front view of a retainer in a modification of the retainer included in the quick-connect coupling shown in FIG. 1;

FIG. 10 is a view of assistance in explaining the operation of complete connection verifying legs shown in FIG. 9;

FIG. 11 is a front view of a coupling body in a modification of a coupling body included in the quick-connect coupler shown in FIG. 1;

FIG. 12 is a longitudinal sectional view of a prior art quick-connect coupling; and FIG. 13 is a longitudinal sectional view of the quick-connect coupling shown in FIG. 12 in a state where a tube and the quick-connect coupling are incompletely connected.

BEST MODE FOR CARRYING OUT THE INVENTION

Figure 1:
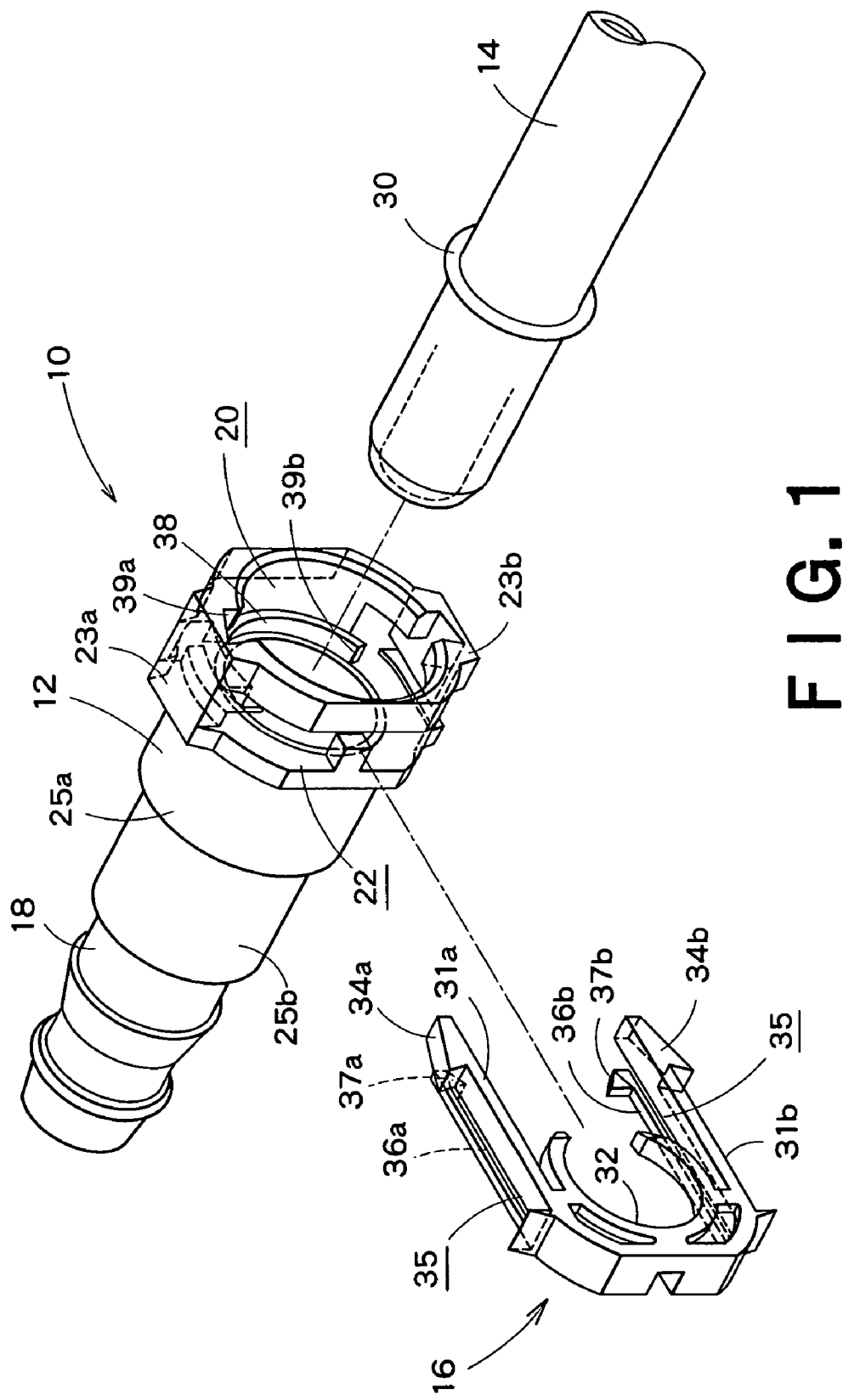
FIG. 1 is an exploded perspective view of a quick-connect coupling in a preferred embodiment according to the present invention.

A quick-connect coupling in a preferred embodiment according to the present invention will be described with reference to the accompanying drawings.

Referring to FIG. 1 showing a quick-connect coupling 10 in an exploded perspective view, the quick-connect coupling 10 has a coupling body 12 and a retainer 16. FIG. 2 is a side elevation of the quick-connect coupling 10. FIG. 3 is a front view of the quick-connect coupling 10. FIGS. 4(a) and 4(b) are longitudinal sectional views of the quick-connect coupling 10 in a state where an end part of a tube 14 is inserted in the quick-connect coupling 10.

The coupling body 12 of the quick-connect coupling 10 is a female fitting having a tube entrance 20 and integrally provided with a male fitting 18 to be forced into a resin tube 17. An end part of the tube 14 is inserted through the tube entrance 20 in the coupling body 12 and the resin tube 17 is joined to the male fitting 18. A stepped passage 21 is formed axially through the coupling body 12 as shown in FIG. 4.

A tangential retainer guide slot 22 is formed in a front end part of the coupling body 12. Locking legs 31a and 31b of the retainer 16 is inserted in the retainer guide slot 22 in a direction perpendicular to the axis of the coupling body 12.

The coupling body 12 has side walls 23a and 23b, a first cylindrical part 25a, a reduced second cylindrical part 25b continuous with the first cylindrical part 25a, and the male fitting 18 continuous with the second cylindrical part 25b. An O ring 27 is fitted in the first cylindrical part 25a and is retained in place by an O ring retainer 28.

Referring to FIGS. 1 and 4, the tube 14 in this embodiment is a metal or resin tube. An annular ridge 30 is formed in a part of the tube 14 in a part at a predetermined distance from the free end of the tube 14. When the retainer is inserted in the retainer guide slot 22, the retainer 16 engages with the annular ridge 30 to restrain the tube 14 from coming off the coupling body 12.

The retainer 16 is a generally U-shaped plastic or metal member having the parallel locking legs 31a and 31b. The retainer 16 is thin as compared with conventional retainers of this kind. The thickness of the retainer 16 corresponds to the width of the retainer guide slot 22.

Referring to FIGS. 1 and 3, a substantially U-shaped rib 32 is formed integrally with the locking legs 31a and 31b of the retainer 16. The U-shaped rib 32 has a curved inner surface of a curvature substantially equal to the curvature of the outer surface of the tube 14. The tube 14 inserted in the coupling body 12 is fitted closely in the rib 32. The locking legs 31a and 31b of the retainer 16 are provided in their end parts with locking hooks 34a and 34b, respectively. When the locking legs 31a and 31b of the retainer 16 are inserted in the retainer guide slot 22 to predetermined locking positions, the locking hooks 34a and 34b engage with the lower edges of the side walls 23a and 23b of the coupling body 12, respectively, as shown in FIG. 8 to retain the retainer 16 in the coupling body 12. When the retainer 16 is thus locked in place, an inner end surface 32a of the U-shaped rib 32 of the retainer 16 engages with the annular ridge 30 to make the tube 14 inseparable from the coupling body 12 as shown in FIG. 7. The quick-connect coupling 10 is designed such that the retainer 16 retained in place in the coupling body 12 cannot be pulled out of the coupling body 12 until a pulling force applied to the retainer 16 exceeds a reference threshold force of about 80N even if the retainer 16 is pulled to extract the retainer 16 forcibly from the coupling body 12 in a state where the locking hooks 34a and 34b of the retainer 16 are engaged with the lower edges of the side walls 23a and 23b.

The retainer 16 is integrally provided with complete connection verifying legs 36a and 36b in combination with the locking legs 31a and 31b, respectively. The complete connection verifying legs 36a and 36b verifies a condition where the retainer 16 and the tube 14 are in a positional relation that enables the complete connection of the quick-connect coupling 10 and the tube 14.

The bar-shaped complete connection verifying legs 36a and 36b extend parallel to the locking legs 31a and 31b, respectively, such that narrow slits 35 are formed between the locking leg 31a and the complete connection verifying leg 36a and between the locking leg 31b and the complete connection verifying leg 36b, respectively. Hooks 37a and 37b are formed on the free ends of the complete connection verifying legs 36a and 36b, respectively.

The coupling body 12 is provided with a blocking part 38 that interferes with the hooks 37a and 37b of the complete connection verifying members 36a and 36b when the retainer 16 is inserted in the coupling body 12. As shown in FIGS. 1 and 3, the blocking part 38 has a crescent shape and extends along the edge of the open end of the passage formed in the first cylindrical part 25a. The blocking part 38 has opposite ends serving as blocking edges 39a and 39b. The hooks 37a and 37b of the complete connection verifying legs 36a and 36b come into contact with the blocking edges 39a and 39b.

The distance A between the hooks 37a and 37b when the complete connection verifying legs 36a and 36b are in a free state is shorter than the diameter B of the annular ridge 30 of the tube 14. When the tube 14 is inserted in the coupling body 12, the annular ridge 30 comes into contact necessarily with the hooks 37a and 37b of the complete connection verifying legs 36a and 36b. The distance between the blocking edges 39a and 39b of the blocking part 38 is determined such that the blocking edges 39a and 39b are directly below the hooks 37a and 37b when the complete connection verifying legs 36a and 36b are in a free state. The retainer cannot be pressed into the coupling body 12 even if a force is exerted on the retainer 16 to press the retainer into the coupling body 12 in this state unless the force exceeds a fixed threshold force. In this embodiment, the threshold force is about 80N. The strength of the complete connection verifying legs 36a and 36b are designed so that the retainer 16 cannot be pressed into the coupling body 12 unless a force exceeding the threshold force is applied thereto.

The annular ridge 30 has a U-shaped cross section. The hooks 37a and 37b of the complete connection verifying legs 36a and 36b are able to slide along the surface of the annular ridge 30. As the hooks 37a and 37b slide down along the surface of the annular ridge 30, the complete connection verifying legs 36a and 36b are bent outward. When the tube 14 is inserted in the coupling body 12 deep enough to set the annular ridge 30 in a plane containing the complete connection verifying legs 36a and 36b as shown in FIG. 5, the space between the complete connection verifying legs 36a and 36b is increased to a maximum as shown in FIG. 6. Consequently, the hooks 37a and 37b are separated from the blocking edges 39a and 39b of the blocking part 38 and the retainer 16 can be pressed into the coupling body 12.

The operation of the quick-connect coupling 10 will be described.

First, the temporary assembly of the coupling body 12 and the retainer 16 will be described. Referring to FIG. 1, the retainer 16 is inserted lightly in the retainer guide slot 22 formed in the coupling body 12. Then, the locking hooks 34a and 34b of the locking legs 31a and 31b of the retainer 16 engages in grooves 40*a* and 40*b* formed in the inner surface of the side walls 23*a* and 23*b* of the coupling body 12 as shown in FIG. 3. When the coupling body 12 and the retainer 16 are thus temporarily assembled, the complete connection verifying legs 36*a* and 36*b* are at positions shown in FIG. 3 and the hooks 37*a* and 37*b* are spaced the distance A apart.

When the quick-connect coupling 10 in this embodiment is shipped, the coupling body 12 and the retainer 16 are temporarily assembled and the resin tube 17 is connected to the quick-connect coupling 10 by forcing the male fitting 18 into the resin tube 17. When the user uses the quick-connect coupling for connecting a fuel pipe for supplying fuel to an engine at an automobile assembling plant, the metal tube 14 can be connected to the quick-connect coupling 10 simply by inserting the metal tube 14 in the coupling body 12 and pressing the retainer 16 into the coupling body 12.

As shown in FIG. 4(*a*), the annular ridge 30 of the tube 14 engages the hooks 37*a* and 37*b* of the complete connection verifying legs 36*a* and 36*b* when an end part of the tube 14 is inserted through the tube entrance 20 in the coupling body 12. If the end part of the tube 14 is inserted deep enough in the coupling body 12 the annular ridge 30 is at a position shown in FIG. 4(*a*) and hence the retainer 16 cannot be fully pressed into the retainer guide slot 22 because the advancement of the hooks 37*a* and 37*b* is blocked by the blocking edges 39*a* and 39*b* of the blocking part 38.

When the tube 14 is pressed further into the coupling body 12, the annular ridge 30 bends the complete connection verifying legs 36*a* and 36*b* so as to move the hooks 37*a* and 37*b* away from each other, and the operator feels a sensation of resistance. When the tube 14 is pressed into the coupling body 12 until the annular ridge 30 comes into engagement with the O ring retainer 28, the annular ridge 30 and the hooks 37*a* and 37*b* of the complete connection verifying legs 36*a* and 36*a* are contained in a plane. FIG. 6 shows the positional relation between the hooks 37*a* and 37*b* of the connection verifying legs 36*a* and 36*b* and the blocking edges 39*a* and 39*b* in a state where the annular ridge 30 and the hooks 37*a* and 37*b* of the complete connection verifying legs 36*a* and 36*a* are contained in a plane. In this state, the hooks 37*a* and 37*b* are able to advance further without being interfered with by the blocking edges 39*a* and 39*b*, so that the retainer 16 can be fully pressed into the coupling body 12.

When the retainer 16 is pressed deep into the coupling body 12, the locking hooks 34*a* and 34*b* engage with the lower edges of the side walls 23*a* and 23*b* of the coupling body 12, respectively, as shown in FIGS. 7 and 8. FIG. 8 is an bottom view of the quick-connect coupling taken from the side of the tube entrance 20.

When a force is exerted on the tube 14 in a direction to pull the tube 14 off the coupling body 12, the inner end surface 32*a* of the rib 32 of the retainer 16 engages with the annular ridge 30 to restrain the tube 14 from axial, outward movement of the tube 14 relative to the coupling body 12. Thus the quick-connect coupling 10 and the tube 14 are firmly connected and locked together. Needless to say, the joint of the coupling body 12 and the tube 14 is sealed by the O rings 27. The locking legs 34*a* and 34*b* of the retainer 16 are strong enough to withstand a destructive force not higher than the predetermined reference threshold force. Preferably, the locking legs 34*a* and 34*b* do not yield to and cannot be removed from the coupling body 12 by a tensile force not higher than 80 N at a minimum.

If the tube 14 is not inserted sufficiently deep into the coupling body 12 as shown in FIG. 4(*b*), an end surface of the annular ridge 30 of the tube 14 is substantially at a position corresponding to the inner end surface 32*a*, namely, stopping surface, of the rib 32, namely, a locking point where the annular ridge 30 can be engaged with the retainer 16.

However, in the state shown in FIG. 4(*b*), the distance between the hooks 37*a* and 37*b* of the complete connection verifying legs 36*a* and 36*b* is not increased properly. Consequently, the hooks 37*a* and 37*b* are in contact with the blocking edges 39*a* and 39*b* and the further insertion of the retainer 16 into the coupling body 12 is obstructed by the blocking edges 39*a* and 39*b*. Since the retainer 16 cannot be further inserted in the coupling body 12 by a considerably high pressure, the insufficient insertion of the tube 14 in the coupling body 12 can be intuitively recognized by the sense of touch. The complete connection verifying legs 36*a* and 36*b* are strong enough not to be broken or chipped unless a high force exceeding a predetermined reference threshold force, preferably, 80 N, is applied thereto. Thus the retainer 16 cannot be further inserted into the coupling body 12 unless the complete connection verifying legs 39*a* and 39*b* are broken by a high force exceeding the predetermined reference threshold force.

The hooks 37*a* and 37*b* are not separated from the blocking edges 39*a* and 39*b* until the tube 14 is inserted so that the annular ridge 30 of the tube 14 is advanced beyond the locking point. Thus the advancement of the annular ridge 30 beyond the locking point can be verified by the agency of the complete connection verifying legs 36*a* and 36*b*. The distance of advancement of the annular ridge 30 beyond the locking point necessary for the separation of the hooks 37*a* and 37*b* from the blocking edges 39*a* and 39*b* is dependent on the thickness of the slits 35 between the locking leg 31*a* and the complete connection verifying leg 36*a* and between the locking leg 31*b* and the complete connection verifying leg 36*b*. Since the complete connection verifying legs 36*a* and 36*b* are necessarily subject to the blocking action of the blocking edges 39*a* and 39*b* and the retainer 16 cannot be further inserted in the coupling body 12 until the tube 14 is properly inserted in the coupling body 12, the incomplete engagement of the tube 14 and the retainer 16 can be surely prevented.

Referring to FIG. 9, a retainer 16 in a modification has complete connection verifying legs 36*a* and 36*b* having hooks 37*a* and 37*b* provided with notches 42*a* and 42*b*, respectively. The notches 42*a* and 42*b* facilitate the engagement of the blocking edges 39*a* and 39*b* with the hooks 37*a* and 37*b*.

The hooks 37*a* and 37*b* of the complete connection verifying legs 36*a* and 36*b* collide against the blocking edges 39*a* and 39*b*, respectively, if the tube 14 is inserted improperly into the coupling body 12. The notches 42*a* and 42*b* of the hooks 37*a* and 37*b* make the separation of the hooks 37*a* and 37*b* from the blocking edges 39*a* and 39*b* more difficult. As shown in FIG. 10, pressure (insertion force) P presses the notches 42*a* and 42*b* against the blocking edges 39*a* and 39*b*. Consequently, the complete connection verifying legs 36*a* and 36*b* have difficulty in shifting in the directions of the arrows A and B, and the complete connection verifying legs 36*a* and 36*b* never separate from the blocking edges 39*a* and 39*b* unless the blocking edges 39*a* and 39*b* break.

After the tube 14 has been properly inserted in the coupling body 12, there is no problem in the movement of the hooks 37*a* and 37*b* of the complete connection verifying legs 36*a* and 36*b* in the direction of the arrow A even if the hooks 37*a* and 37*b* are provided with the notches 42*a* and 42*b*, respectively.

Referring to FIG. 11, a coupling body 12 in a modification is provided with backup walls 44*a* and 44*b* protruding toward a tube entrance 20 so that the backup walls 44*a* and 44*b* may not interfere with the annular ridge 30 of the tube 14. The backup walls 44a and 44b engage with the rib 32 to support the rib 32.

FIG. 11(a) shows the retainer 16 not pressed fully into the coupling body 12 and FIG. 11(b) shows the retainer 16 pressed fully into the coupling body 12. In the state shown in FIG. 11(b) the opposite ends 45a and 45b of the rib 32 overlap the backup walls 44a and 44b, respectively.

When a pulling force is applied to the tube 14 in a direction to pull the tube 14 off the coupling body 12 in the state shown in FIG. 7, the annular ridge 30 of the tube 14 exerts a pressure on the inner end surface 32a of the rib 32. If the pressure is excessively high, it is possible that the rib 32 is deformed and the tube 14 comes off the coupling body 12. When parts, corresponding to the ends 45a and 45b overlapping the backup walls 44a and 44b, of the outer end surface opposite the inner end surface 32a of the rib 32 is in contact with the backup walls 44a and 44b as shown in FIG. 11(b), the backup walls 45a and 45b supports the rib 32 to prevent the deformation of the rib 32 and, consequently, the tube 14 cannot be pulled off the coupling body 12.

The slits 35 are formed between the locking leg 31a and the complete connection verifying leg 36a and between the locking leg 31b and the complete connection verifying leg 36b, respectively, in the retainer 16. The slits 35 may be of a very small thickness. Since the retainer 16 of the present invention is very thin as compared with conventional retainers, the coupling body 12 can be formed in a length shorter than that of the conventional coupling body shown in FIG. 12. The quick-connect coupling 10 of the present invention facilitates the discrimination of a state of complete connection from a state of incomplete connection.

Although the retainer 16 of the quick-connect coupling 10 of the present invention has both the locking legs 31a and 31b and the complete connection verifying legs 36a and 36b, a quick-connect coupling in a modification may include a retainer provided with only locking legs, and a separate complete connection verifying member.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

The invention claimed is:

1. A quick-connect coupling comprising:
   a coupling body into which an end part, provided with an annular ridge, of a tube is insertable;
   a retainer insertable through a window into the coupling body in a direction perpendicular to the axis of the coupling body so as to engage the annular ridge and to retain the end part of the tube in the coupling body, the retainer comprising complete connection verifying members integrally formed with the retainer to enable the retainer to be pressed through the window into the coupling body only after the annular ridge of the tube has advanced to a position where the retainer can engage the annular ridge of the tube;
   wherein the coupling body comprises a blocking part that engages with the complete connection verifying members to restrain the complete connection verifying members from being pressed into the coupling body when the annular ridge of the end part of the tube has not advanced to the position where the retainer can engage the annular ridge of the tube.

2. The quick-connect coupling according to claim 1, wherein the retainer has a rib having an inner end surface that engages with the annular ridge of the tube to retain the annular ridge in place and locking legs respectively having locking hooks that engage with side walls of the coupling body, respectively, and the complete connection verifying members extend along the locking legs of the retainer and are provided at their free ends with hooks capable of coming into contact with the blocking part, respectively.

3. The quick-connect coupling according to claim 2, wherein the hooks of the complete connection verifying members are provided with notches to which ends of the blocking part engage.

4. The quick-connect coupling according to claim 2, wherein the coupling body has backup parts for supporting the rib, and when a pulling force is exerted on the tube connected to the coupling body in a direction to pull the tube out of the coupling body, the backup parts support the rib to retain the tube in the coupling body so that the backup parts are pressed against and an outer end surface opposite the inner end surface in engagement with the annular ridge.

5. The quick-connect coupling according to claim 2, wherein the complete connection verifying members have a strength such that the hooks of the complete connection verifying members cannot be separated from the blocking part by a pressure not higher than a predetermined reference threshold force to make the retainer unable to be pressed in the coupling body unless the tube is inserted in the coupling body so that the annular ridge of the tube is advanced clear of the rib into the coupling body beyond a position corresponding to the inner end surface of the rib.

6. The quick-connect coupling according to claim 5, wherein the retainer has a strength enough to make the retainer unable to be removed from the coupling body by a tensile force not higher than the predetermined reference threshold force in a state where the tube is retained normally in the coupling body by the retainer.

7. The quick-connect coupling according to claim 6, wherein the reference threshold force is 80N.

8. The quick-connect coupling according to claim 5, wherein the reference threshold force is 80N.

9. The quick-connect coupling according to claim 2, wherein a slit is formed between each of the locking legs and the complete connection verifying member adjacent to the locking leg.

10. The quick-connect coupling according to claim 9, wherein the retainer is a thin, substantially U-shaped member.

11. The quick-connect coupling according to claim 1, wherein the retainer is a thin, substantially U-shaped member.

* * * * *